United States Patent [19]

Ishikawa

[11] Patent Number: 5,241,403
[45] Date of Patent: Aug. 31, 1993

[54] IMAGE COMMUNICATION SYSTEM INCLUDING MEANS FOR STORING FUNCTION INFORMATION OF DESTINATION RECEIVING MACHINE

[75] Inventor: Yuji Ishikawa, Yokohama, Japan

[73] Assignee: Canon Kabushiki Kaisha, Tokyo, Japan

[21] Appl. No.: 764,201

[22] Filed: Sep. 23, 1991

[30] Foreign Application Priority Data

Sep. 28, 1990 [JP] Japan .................................. 2-259947
Oct. 8, 1990 [JP] Japan .................................. 2-270299

[51] Int. Cl.⁵ ............................................ H04N 1/40
[52] U.S. Cl. ..................... 358/440; 358/400
[58] Field of Search ................. 358/440, 442, 468; 379/100

[56] References Cited

U.S. PATENT DOCUMENTS 4,876,604 11/1989 Nobuta ................................ 358/400
4,910,765 3/1990 Matsuse et al. ................. 379/100

FOREIGN PATENT DOCUMENTS 3512070 10/1985 Fed. Rep. of Germany .
3541003 5/1986 Fed. Rep. of Germany .
2172479 9/1986 United Kingdom .

OTHER PUBLICATIONS

Kenneth R. McConnell et al. "Fax: Digital Facsimile Technologies And Applications", Artech House, 1989, pp. 194-195.
IBM Technical Disclosure Bulletin, vol. 32, No. 12, p. 34 (1990).

Primary Examiner—Stephen Brinich
Attorney, Agent, or Firm—Fitzpatrick, Cella, Harper & Scinto

[57] ABSTRACT

An image communication system comprises a memory for storing information on a function of a destination receiving machine, a reader for reading a document image, an image memory for storing the read image data, a transmitter for transmitting the image data stored in the image memory, a console unit for designating a memory transmission mode, and a control unit for controlling, in the memory transmission mode, the reading of the document image in accordance with the information stored in the memory means and storing the read image data into the image memory.

21 Claims, 6 Drawing Sheets

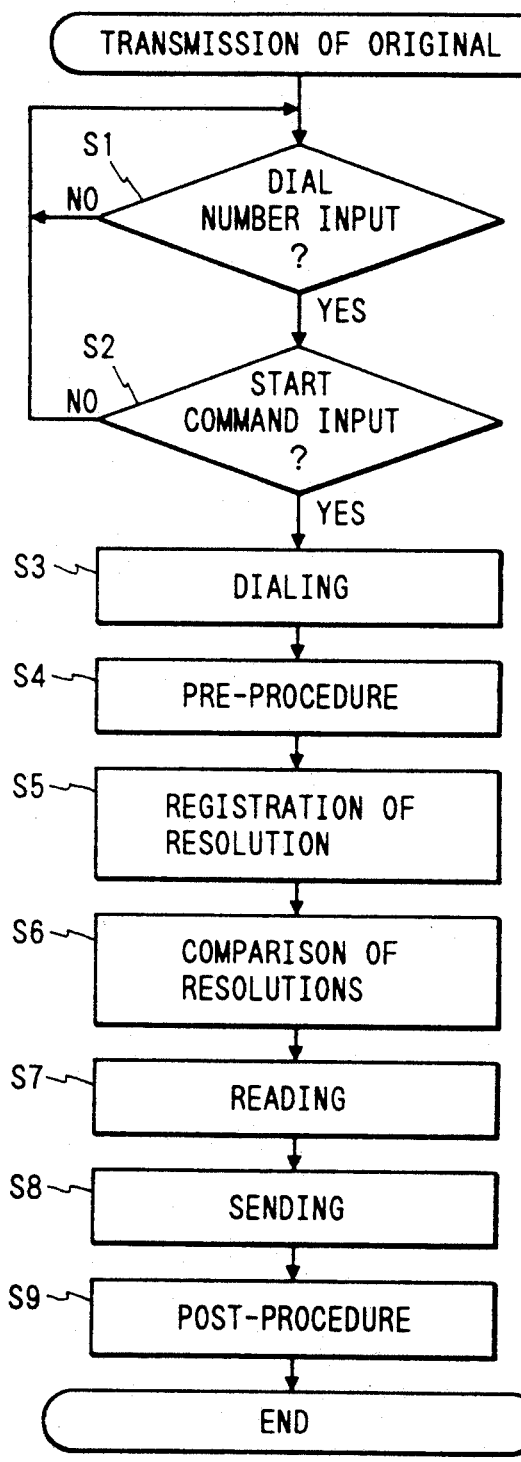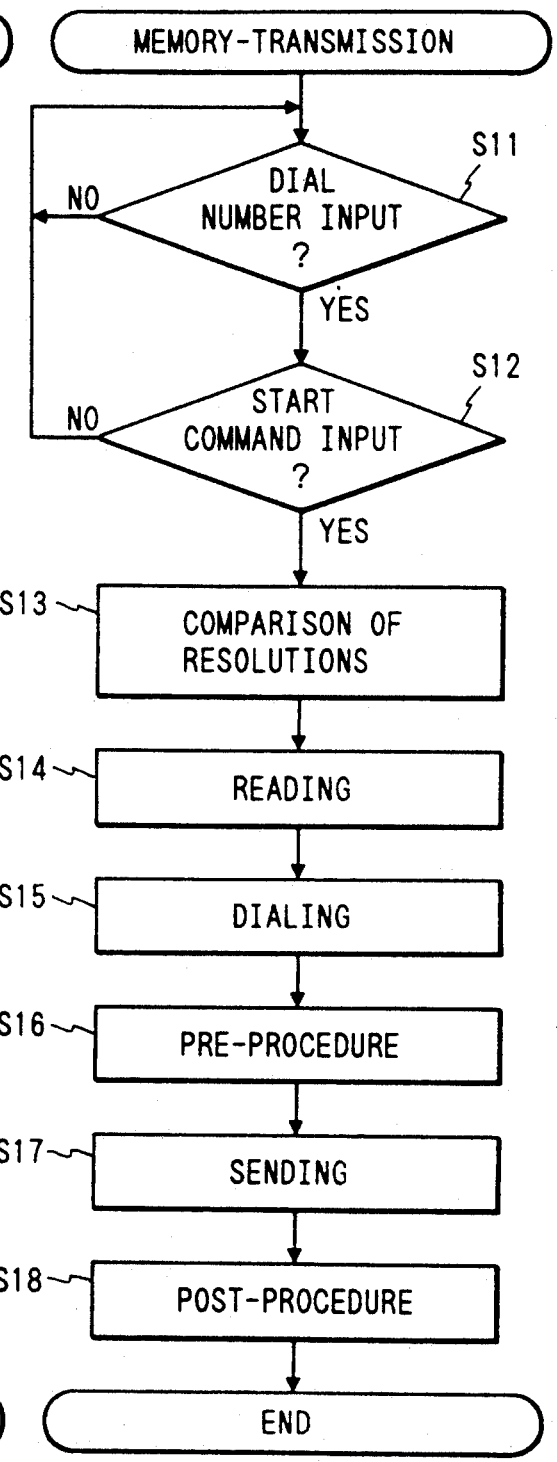

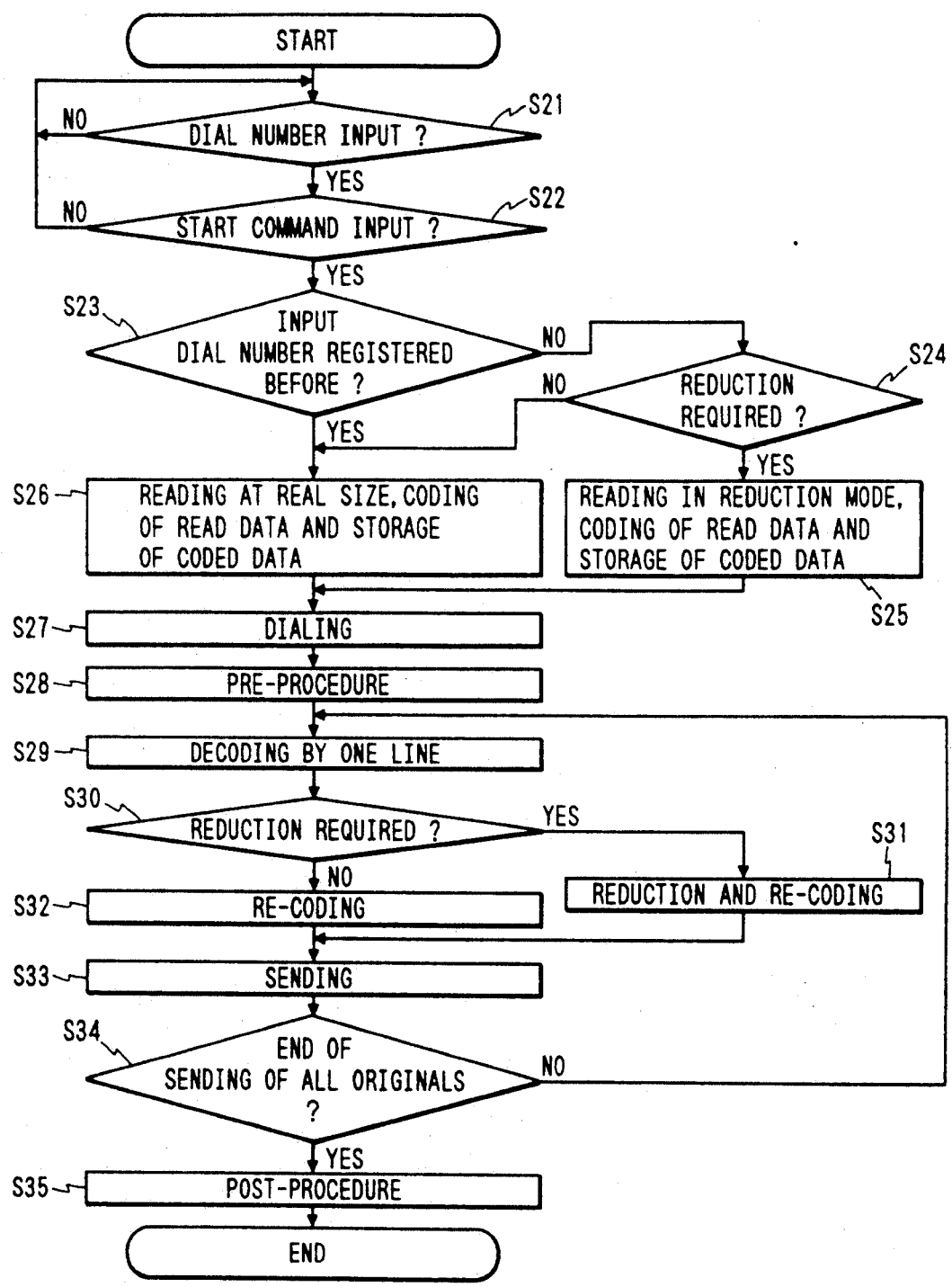

IMAGE COMMUNICATION SYSTEM INCLUDING MEANS FOR STORING FUNCTION INFORMATION OF DESTINATION RECEIVING MACHINE

BACKGROUND OF THE INVENTION

1. Field of the Invention

The present invention relates to an image communication system which reads a document image, stores the read image data into a memory and transmits the image data stored in the memory.

2. Related Background Art

A facsimile machine has been known in the art as such a system.

A facsimile machine having a memory store transmission mode in which an image read from a document is temporarily stored into a memory, a facsimile protocol is executed to a destination machine and the image is transmitted, has also been known in the art.

In a normal transmission mode (document transmission mode) in which reading of the document and transmission are simultaneously conducted, the document may be read in a pre-protocol of communication with a resolution power (for example, 3.85 lines/mm, 7.7 lines/mm or 15.4 lines/mm) which is compatible with a receiving capability of the destination machine.

However, in the memory transmission mode, the reading of the document has already been finished before the execution of the pre-protocol. Thus, it is not always true that the transmission is done at the resolution power of the reading, and if the resolution powers do not match, the transmitting machine must take out some main scan lines of the read image data.

However, the take-out (or thinning) of the main scan lines causes a two-dimensional variation of binary data and deteriorates an image quality.

For example, when a conversion from 15.4 lines/mm to 7.7 lines/mm is done, it means that non-contiguous main scan lines read from a narrow area along a sub-scan direction are enlarged by a factor of two in a print mode. Thus, the image quality is lower than that attained by reading the document at 7.7 lines/mm.

Particularly, in a half-tone image, half-tone is pretendedly expressed by an average density of binary pixels. Accordingly, if the main scan lines are taken out, the image quality is very poor.

Where a size of document read and a size of a record sheet at the receiving station are different, the same problem as that in the mismatch of the resolution power takes place.

When a destination station and the memory transmission mode are designated from a console panel, an image is read by a reader at a unity magnification (real-size), and the image data is encoded and the data of the entire document is temporarily stored in a memory. Then, the designated destination station is called and the pre-protocol is executed.

When the image data is transmitted to the destination station, the image data stored in the memory is temporarily decoded and it is reproduced as an original image in a transmission line memory, and it is re-encoded in accordance with a code mode permitted by the destination receiving machine and sent out.

If a width of the document is larger than a width of the record sheet of the destination receiving machine, it is reduced at the transmitting station as described above. This is done in the re-encode mode by the random take-out of pixels in the main scan direction and the random take-out of lines in the sub-scan direction.

In the case of mismatching of sizes, the binary image stored in the memory is to be reduced in size. As a result, the image is distored and fine lines are lost, and the image quality is lowered.

Particularly when the half-tone image represented by binary data is reduced in size, the distribution of binary pixels which represent half-tone pretendedly becomes ununiform, and moire fringe, longitudinal fringe or lateral fringe appears. Thus, the degradation of the image quality due to the size reduction is more remarkable than that for a toneless image.

Patent applications relating to a facsimile machine having a memory transmission mode are U.S. Pat. Nos. 4,796,092, 4,814,890, 4,772,955 and 4,845,569.

However, no proposal to solve the above problems has been made.

SUMMARY OF THE INVENTION

In the light of the above, it is an object of the present invention to improve an image communication system.

It is another object of the present invention to provide an image communication system which prestores information on a function of a destination receiving machine, reads a document image in a memory transmission mode in accordance with the stored information and stores the image information into a memory.

It is still another object of the present invention to provide an image communication system which reads a document at a proper resolution power or size in the memory transmission mode.

Other objects of the present invention will be apparent from the following detailed description of the embodiments and the accompanying drawings.

BRIEF DESCRIPTION OF THE DRAWINGS

FIG. 3 shows a flow chart of a control operation in a document read/transmit mode when the resolution power information is registered, FIG. 4 shows a flow chart of a control operation in a memory transmission mode which uses the registered resolution power information, FIG. 6 shows a flow chart of a control operation in the memory transmission mode which uses the registered record sheet size information.

DETAILED DESCRIPTION OF THE PREFERRED EMBODIMENTS

The embodiments of the present invention are now explained in detail with reference to the drawings.

Figure 1:
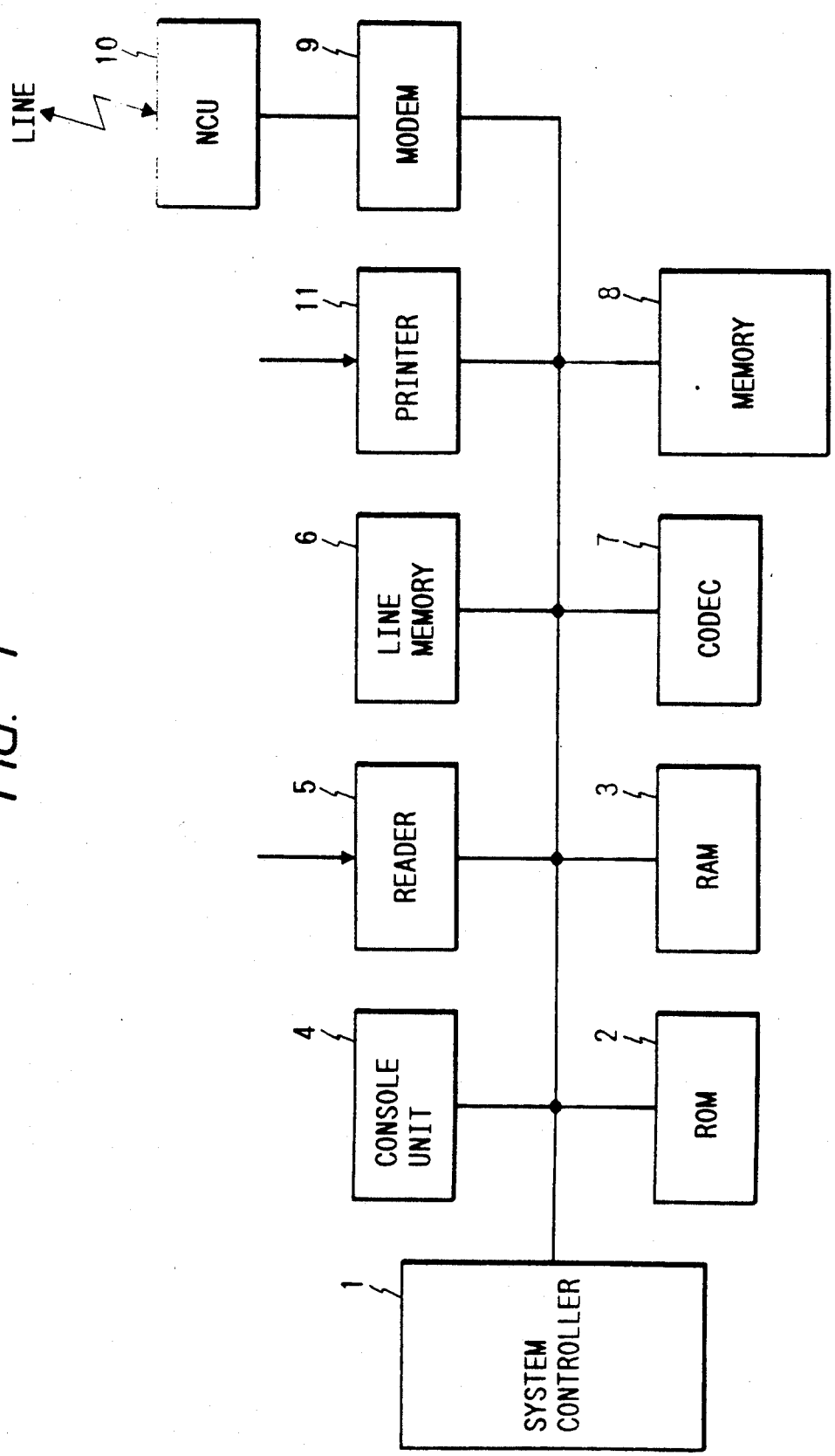
FIG. 1 shows a block diagram of a configuration of a facsimile machine in accordance with one embodiment of the present invention.

FIG. 1 shows a block diagram of a configuration of a facsimile machine in accordance with one embodiment of the present invention.

The facsimile machine comprises a system control unit 1 which controls an overall operation of the machine, a ROM 2 which contains a program to be executed by the system control unit 1, and a RAM 3 for storing destination telephone numbers corresponding to one-touch dialing numbers or abbreviated dialing numbers and resolution power information.

The facsimile machine further comprises a console unit 4 having input buttons such as a ten-key pad, one-touch keys and resolution power selection keys, and a display, a reader 5 which reads the document by a CCD and sends binary data to a system bus, a line buffer memory 6 for buffering the image data, a CODEC (encoder/decoder) 7 which reads the image data from the line buffer memory 6 and encodes it, or receives the coded data and decodes it, and stores it in the line buffer memory 6, a large capacity memory 8 for storing the coded image data, a modem 9 for modulating-/demodulating the input/output signal on the line, and a network control unit (NCU) 10 for controlling the connection with the line.

Figure 2:
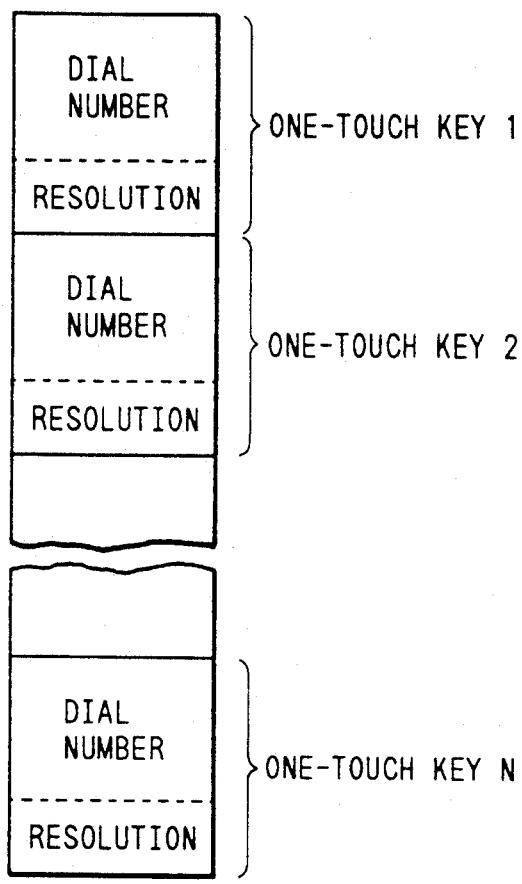
FIG. 2 shows a memory (RAM) for storing registered data of resolution power information and telephone numbers of destination stations.

FIG. 2 shows a configuration of the memory which stores registered data corresponding to N one-touch dialing numbers in the facsimile machine.

The memory is located in the RAM 3 and has areas to store the destination telephone number and the resolution power information acceptable by the destination receiving machine, for each of the one-touch dialing numbers. Similar memory areas are provided for the abbreviated dialing numbers although they are not shown.

FIG. 3 shows a flow chart of an original document transmission mode. In the present embodiment, the document transmission mode and the memory transmission mode can be selected by the mode selection.

When a destination telephone number is designated by the key entry such as the one-touch key on the console unit 4 (S1) and the key which commands the start of the document transmission is depressed (S2), the corresponding telephone number is called by the NCU 10 (S3).

When the call is received by the destination facsimile machine, a pre-procedure (pre-protocol) of the facsimile communication is executed in accordance with the CCITT Recommendation T.30 (S4). The source facsimile machine determines the resolution power acceptable by the destination facsimile machine based on a DIS signal sent from the destination facsimile machine.

Assuming that the call is made by using the one-touch key or the abbreviated dialing number of the source facsimile machine, the resolution power information of the destination receiving machine is stored in the memory area of the resolution power data shown in FIG. 2 (S5).

In the transmission of the image, the resolution power designated by the resolution power selection key on the console unit 4 and the resolution power information from the DIS signal are compared (S6). If the destination receiving machine can receive the data at the resolution power designated by the source facsimile machine, the image is read at that resolution power, and if the destination receiving machine cannot receive the data at the designated resolution power, the image is read at a resolution power which is compatible to the destination receiving machine (S7).

The read data is transferred from the reader 5 to the line buffer memory 6. The encoder/decoder 7 sequentially reads the image data from the line buffer memory 6 and encodes it. The coded data is modulated by the modem 9 and sent out to the line through the NCU 10 (S8).

When all documents have been transmitted, a post-procedure (post-protocol) is executed (S9) to complete the communication.

FIG. 4 shows a flow chart of the memory transmission mode.

When a destination telephone number is designated by a key entry such as the one-touch key on the console unit 4 (S11) and a key designating the start of the memory transmission mode is depressed (S12), the resolution power memory area of the RAM 3 which corresponds to the designated destination telephone number is referred and it is compared with the resolution power designated by the resolution power selection key on the console unit 4 (S13). If there is a matching resolution power, the document is read at that resolution power. If there is no matching resolution power, a resolution power which is acceptable by the destination receiving machine and which is closest to the resolution power designated by the resolution power selection key is automatically selected and the image is read at the selected resolution power, and it is sequentially encoded and stored in the memory 8 (S14).

Then, the call is made to the corresponding telephone number by the NCU 10 (S15), and when the call is received by the destination facsimile machine, the pre-procedure (pre-protocol) of the facsimile communication is executed in accordance with the CCITT Recommendation T.30 (S16). The source facsimile machine determines the resolution power acceptable by the destination facsimile machine based on the DIS signal from the destination facsimile machine, and when it is different from the resolution power stored in the resolution power memory area of the RAM 3, it updates the resolution power data registered in the RAM 3.

If there has been no transmission to the designated destination telephone number in the post, the resolution power information for the destination in the memory 3 is set to 7.7 lines/mm because most facsimile machines have the resolution power of 7.7 lines/mm as a standard feature although it is optional in the CCITT Recommendation and it is used as a default value.

Then, the coded data is read from the memory 8 and it is modulated by the modem 9 and sent out to the line through the NCU 10 (S17).

When all documents have been transmitted, the post-procedure (post-protocol) is executed (S18) to complete the communication.

In a multi-address transmission mode, the lowest resolution power of the destinations for the multi-address transmission is selected.

Where the destination telephone number is not registered in the facsimile machine and the ten-key pad is used to dial the telephone number, the telephone numbers for the past several tens of communications and the resolution powers thereof may be stored so that if the dialing number by the ten-key pad matches one of the stored telephone numbers the corresponding resolution power is used to read the image. In this manner, the same process as that in the one-touch dialing is attained. If there is no matching, a default value of 7.7 lines/mm is used as a selectable upper limit.

The matching and mismatching of the document size and the record sheet size of the destination receiving machine are now discussed.

Figure 5:
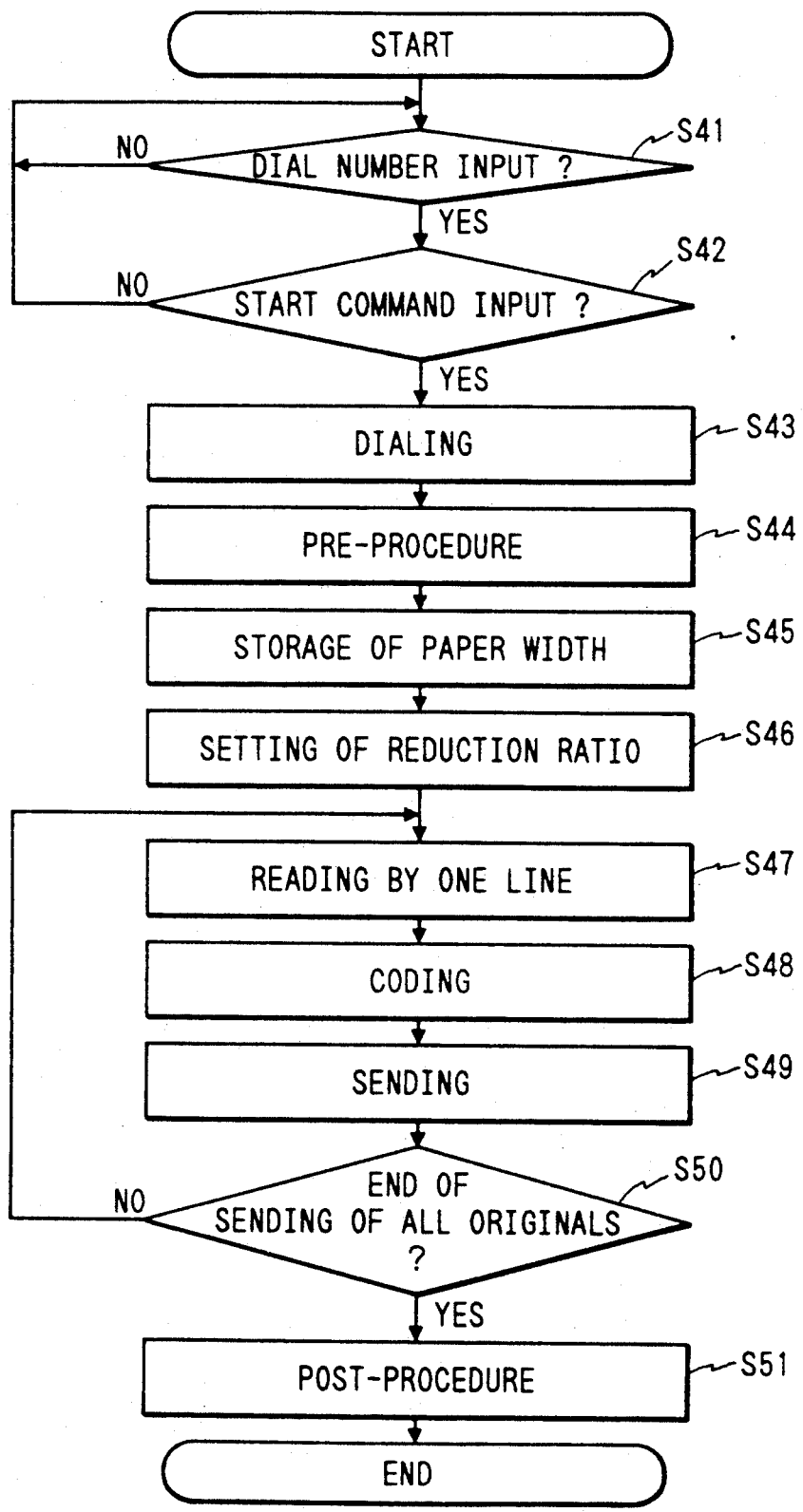
FIG. 5 shows a flow chart of a control operation in the document read/transmit mode when record sheet size information is registered.

FIG. 5 shows a flow chart of an operation in the document transmission mode.

In the document transmission mode, when a destination telephone number is designated by a key entry such as the one-touch key on the console unit 4 (S41) and the start of the document transmission mode is commanded (S42), a call is made to the corresponding destination by the NCU 10 (S43).

When the call is received by the destination station, the pre-procedure (pre-protocol) is executed in accordance with the CCITT Recommendation T.30 (S44). The source facsimile machine determines a record sheet width of the destination receiving machine. If the called destination station has been registered in the one-touch dialing numbers or the abbreviated numbers of the facsimile machine, the record sheet width information is stored in a predetermined area of the RAM 3 (S45).

A main scan size reduction ratio (reduction factor) is set to the reader 5 so that the document width to be transmitted matches the record sheet width of the destination receiving machine (S46).

In the image data read/transmit mode, the reader 5 feeds the document in accordance with a sub-scan size reduction factor for each reading of the main scan line, and stores one line of read data into the line memory 6 (S47).

On the other hand, the encoder/decoder 7 now functions as an encoder, and reads the image data line stored in the line memory 6 and encodes it (S48).

The coded data is modulated by the modem 9 and sent out to the line by the NCU 10 (S49).

When all documents have been transmitted (S50), the post-procedure (post-protocol) is executed to complete the communication (S51).

FIG. 6 shows a flow chart of an operation in the memory store transmission mode.

In the memory store transmission mode, when the destination telephone number is entered (S21) and the start of the memory store transmission is commanded (S22), it is determined whether the designated destination telephone number has been registered in the one-touch dialing numbers or the abbreviated dialing numbers (S23). If it has been registered, the record sheet width information of the destination machine obtained in the previous transmission is referred (S24), and if the size reduction is required, the document is read at the corresponding reduction factor and it is encoded and stored in the memory 8 (S25).

If the destination telephone number has not been registered in S23 or the size reduction is not required in S24, the image is read at a real-size (a unity magnification), and it is encoded and stored in the memory 8 (S26).

After all images have been stored, a call is made (S27) and the pre-procedure (pre-protocol) is executed (S28).

In the image transmission mode, one line of data is read from the memory 8, and it is decoded to reproduce an original image in the line memory 6 (S29), and it is re-encoded by the encoding mode acceptable by the destination receiving machine and it is transmitted (S30~S33).

In the memory store transmission mode of the present embodiment, the encoding and the re-encoding are required in the transmission of the image in order to make the encoding mode match to that of the destination receiving machine, as they are in the prior art machine, but the degradation of the image quality is prevented in the present embodiment because the size reduction is done prior to the binarization of the read image signal.

In the re-encoding, if the destination telephone member has not been registered (S23) or the function of the destination receiving machine is different from that of the source facsimile machine, the size reduction may be done in the same manner as that in the prior art machine as required and the resulting image data may be transmitted.

The record sheet width of the destination receiving machine may vary between the previous transmission and the current transmission, but this is a very rare case, and in most cases the effect of avoiding the degradation of the image quality due to the image size reduction is sufficiently attained.

When all documents have been transmitted (S34), the post-procedure (post-protocol) is executed to complete the communication (S35).

Figure 7:
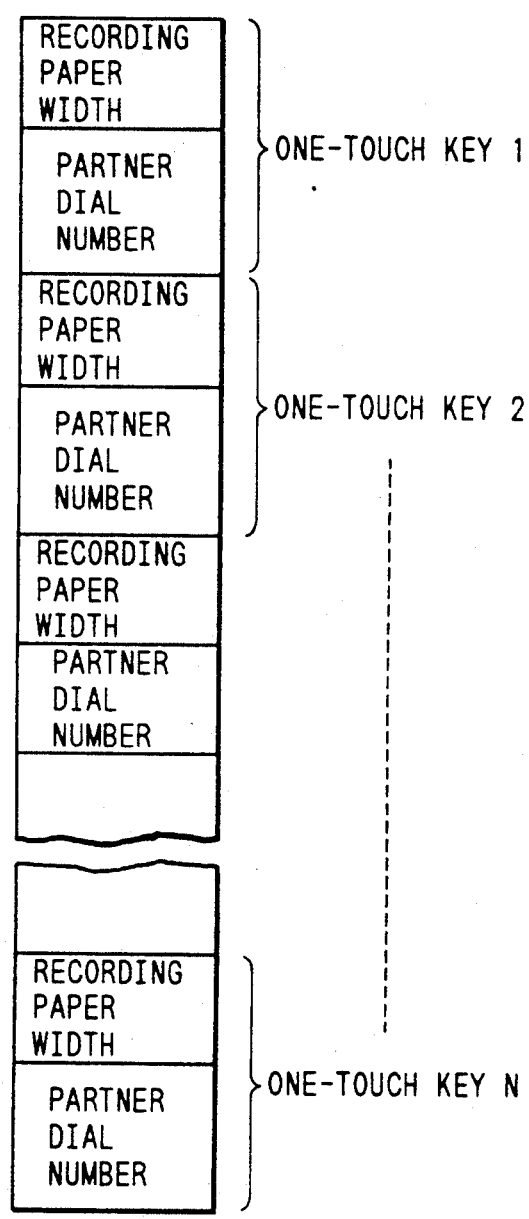
FIG. 7 shows a memory (RAM) for storing registered data of record sheet size information and telephone numbers of destination stations.

FIG. 7 shows a diagram of a registration area of the RAM 3 for the one-touch dialing numbers on the console unit 4.

As shown, a record sheet width and a telephone number of a destination station area stored for each one-touch dialing number. A similar configuration is used for the abbreviated dialing numbers.

Figure 8A:
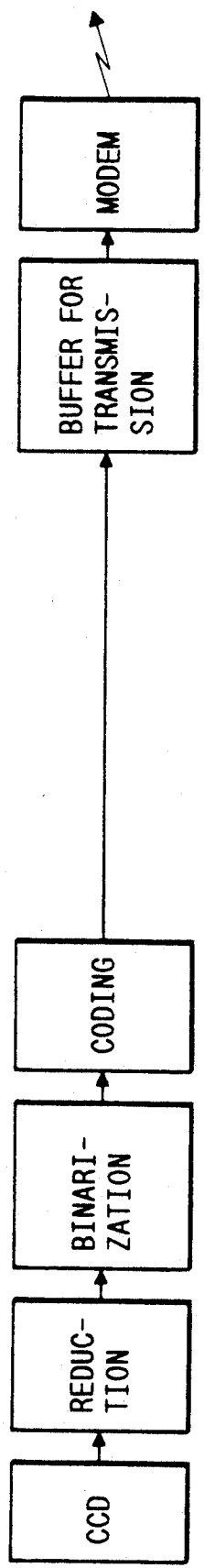
FIGS. 8A to 8C show process from the reading of a document to the transmission, for the transmission of the document, a prior art memory transmission mode, and the memory transmission mode of the present embodiment.
Figure 8B:
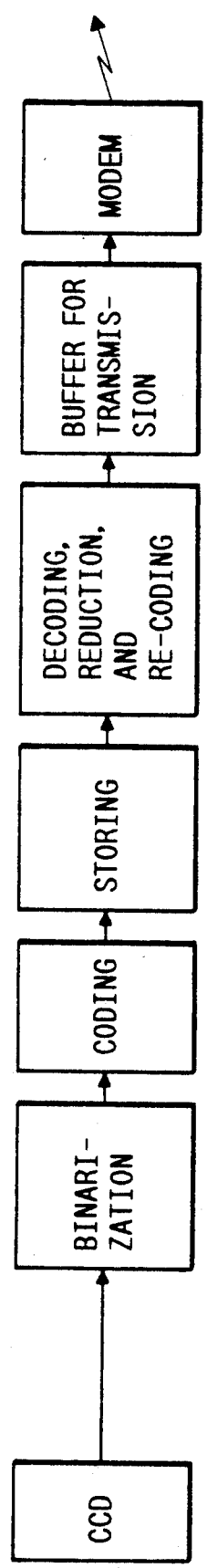
Figure 8C:
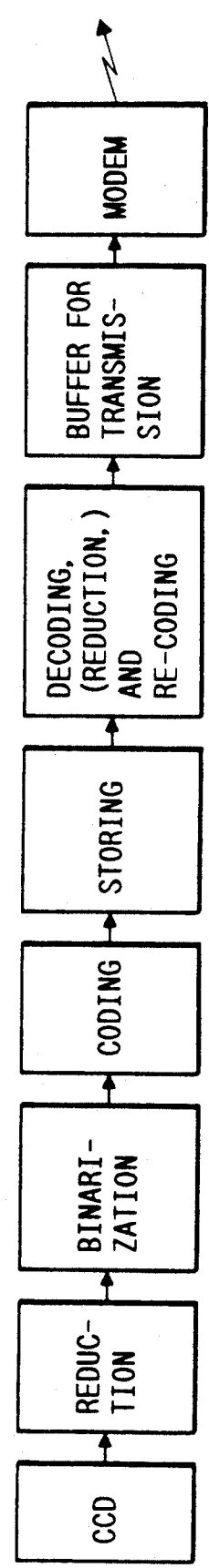

FIGS. 8A to 8C show processing of the image data from the reading of the document to the transmission, for the document transmission (FIG. 8A), the memory transmission in the prior art (FIG. 8B), and the memory transmission in the present embodiment (FIG. 8C).

(a) Document Transmission

Pixel data in the analog data read by the reader such as CCD are taken out (or thinned) at a predetermined period in accordance with a size reduction factor.

In the binarization process, the size-reduced analog data is binarized in accordance with a difference between the brightnesses of the pixel under consideration and the surrounding pixels.

The binary data is encoded and temporarily stored in a transmission buffer defined in the RAM 3. The modem sequentially reads the coded data from the transmission buffer and sends it to the line.

(b) Memory Transmission in the Prior Art

A unit magnification is used up to the storing into the memory. When it is transmitted from the memory, it is decoded, size-reduced and re-encoded.

(c) Memory Transmission in the Present Embodiment

When the image data is stored into the memory, it is size-reduced as it is in the document transmission mode, in accordance with the record sheet width of the destination receiving machine which was derived in the previous transmission. When it is transmitted, it is decoded and re-encoded. If the record sheet width of the destination receiving machine is smaller than the previous one and the size reduction is required, the image data is decoded, size-reduced and re-encoded as shown in the previous flow chart, as it is in the prior art.

At the first transmission to the destination station registered in the one-touch or abbreviated dialing number, the record sheet width for the size A4 or an infinite may be selected as a default value.

In the above embodiments, the memory transmission mode to the destination stations registered in the one-touch or abbreviated dialing numbers has been explained. When a destination telephone number is directly designated by the ten-key pad, the telephone numbers of the past several communications and the corresponding record sheet widths may be stored and if the destination telephone number directly entered matches one of the past telephone numbers, the corresponding record sheet width may be referred to attain the same effect.

When the transmission is requested and the size reduction is required in accordance with the document width and the record sheet width of the destination machine, it may be displayed on a display to inform an operator that the unity magnification transmission is not attainable.

In the multi-address transmission mode, the document may be read at a size reduction factor which corresponds to a minimum record sheet width in the multi-address destinations.

In outputting a report of the registered data for the one-touch and abbreviated dialing numbers, the record sheet widths of the destination stations may be printed out together with the registered telephone numbers to request an attention of the operator In the present embodiment, the size reduction in the memory transmission mode is done in the read mode based on the previous record sheet width information. Thus, the loss of data due to the take-out of the image data is eliminated and the degradation of the image quality is prevented.

For the half-tone image, the effect is remarkable in that the size reduction of the image is not unnatural because the image data is size-reduced in the state of an analog signal.

Further, the volume of the image data to be read is reduced and the usage efficiency of the image memory is improved.

The present invention is not limited to the above embodiments but various modifications thereof may be made.

What is claimed is:

1. An image communication system comprising:
   memory means for storing function information on a function of a destination receiving machine;
   read means for reading a document image;
   an image memory for storing read image data;
   means for transmitting the image data stored in said image memory;
   designating means for designating a memory transmission mode; and
   control means for controlling, when the memory transmission mode is designated by said designating means, the reading of the document image in accordance with the function information stored in said memory means, wherein the read image data is stored into said image memory.

2. An image communication system according to claim 1 wherein said control means controls a read resolution for the document image.

3. An image communication system according to claim 2 further comprising means for designating a read resolution of said read means, said control means comparing the read resolution designated by said designation means and the information stored in said memory means and setting a read resolution in accordance with the comparison.

4. An image communication system according to claim 1 wherein said control means controls a size of a read image.

5. An image communication system according to claim 1 wherein said memory means stores the information in association with a telephone number of the destination station.

6. A system according to claim 1, further comprising receiving means for receiving the function information from the destination receiving machine, wherein said memory means stores the function information received by said receiving means.

7. A system according to claim 1, further comprising input means for inputting control information manually, wherein said control means controls the reading of the document image in accordance with the function information and/or the control information.

8. A system according to claim 7, wherein said control means controls the reading of the document image in accordance with the function information when the function information and the control information are different from each other.

9. An image communication system comprising:
   read means for reading a document at one of a plurality of resolutions;
   an image memory for storing read image data;
   transmission means for transmitting the image data;
   memory means for storing resolution information on a resolution acceptable by a destination station;
   console means for designating a read resolution, a memory transmission mode and a destination station for the memory transmission; and
   control means for comparing, when the memory transmission mode is designated, the resolution information stored in said memory means and the designated read resolution, and setting a read resolution for said read means in accordance with the comparison, wherein the read image data is stored into said image memory.

10. An image communication system according to claim 9 wherein said memory means stores the resolution information in association with a telephone number information of the destination station, and said control means makes a call in accordance with the telephone number stored in said memory means after having stored the image data into said image memory.

11. An image communication system according to claim 9 wherein said control means selects the designated read resolution when the designated read resolution matches the resolution information stored in said memory means.

12. An image communication system according to claim 9 wherein said control means selects the resolution stored in said memory means when the designated read resolution does not match the resolution stored in said memory means.

13. An image communication system comprising:
   read means for reading a document;
   detection means for detecting a size of the document;
   an image memory for storing image data;
   transmission means for transmitting the image data;
   memory means for storing image size information on an image size acceptable by a destination station;

console means for designating a memory transmission mode and a destination for the memory transmission mode; and control means for comparing, when the memory transmission mode is designated, the image size information stored in said memory means and the document size detected by said detection means, and reducing the read image in accordance with the comparison, wherein the image data is stored into said image memory.

14. An image communication system according to claim 12 wherein said memory means stores the size information in association with telephone number information of the destination station, and said control means makes a call in accordance with the telephone number information stored in said memory means after having stored the image data into said image memory.

15. An image communication system according to claim 13 wherein said control means stores the read image at a unity magnification into said image memory when the acceptable size matches to the document size, and stores a size-reduced read image into said image memory when the acceptable size is smaller than the document size.

16. A method for reading a document in a memory transmission mode comprising the steps of:

preregistering information on a function of a destination receiving machine;

discriminating whether the memory transmission mode is set or not;

controlling the reading of the document in accordance with the preregistered information corresponding to the designated destination station when the memory transmission mode is set; and storing a read image into an image memory to transmit the read image to the destination receiving machine.

17. A method for reading a document according to claim 16 further comprising a step of designating a read resolution for the document, said storing step comparing the designated read resolution with the registered information and setting a read resolution in accordance with the comparison.

18. A method for reading a document according to claim 16 further comprising a step of detecting a document size, said storing step comparing the detected document size with the registered information, enlarging or reducing the read image in accordance with the comparison and storing the image data into the image memory.

19. A method according to claim 16, wherein the function on which information is preregistered is received from the destination receiving machine.

20. A method according to claim 16, further comprising a step of inputting control information manually, wherein in said control step, the reading of the document is controlled in accordance with the preregistered information and/or the input information.

21. A method according to claim 20, wherein in said control step, the reading of the document is controlled in accordance with the preregistered information when the input information is different from the preregistered information.

* * * * *

UNITED STATES PATENT AND TRADEMARK OFFICE
CERTIFICATE OF CORRECTION

PATENT NO. : 5,241,403
DATED : August 31, 1993
INVENTOR(S) : YUJI ISHIKAWA

It is certified that error appears in the above-identified patent and that said Letters Patent is hereby corrected as shown below:

COLUMN 1

Lines 44-45, "pretendedly" should read --representatively--.

COLUMN 2

Line 10, "pretendedly" should read --representatively--.

COLUMN 4

Line 68, "numbers" should read --numbers,--.

COLUMN 6

Line 10, "mem-" should read --num- --.

COLUMN 9

Line 12, "claim 12" should read --claim 13--.

Signed and Sealed this

Third Day of May, 1994

Attest:

BRUCE LEHMAN

Attesting Officer   Commissioner of Patents and Trademarks